Sept. 8, 1964 G. H. FATHAUER 3,148,303

TRANSISTOR CAMERA CIRCUITRY

Filed March 7, 1960 3 Sheets-Sheet 1

Inventor
George H. Fathauer by Hill, Sherman, Meroni, Gross & Simpson Attys.

Sept. 8, 1964 G. H. FATHAUER 3,148,303

TRANSISTOR CAMERA CIRCUITRY

Filed March 7, 1960 3 Sheets-Sheet 2

Inventor
George H. Fathauer by Hill, Sherman, Meroni, Gross & Simpson Attys.

Inventor
George H. Fathauer
by Hill, Sherman, Meroni, Gross & Simpson Attys.

United States Patent Office 3,148,303

Patented Sept. 8, 1964

3,148,303
TRANSISTOR CAMERA CIRCUITRY

George H. Fathauer, Decatur, Ill., assignor, by mesne assignments, to Harvey-Wells Corporation, Framingham, Mass., a corporation of New Jersey Filed Mar. 7, 1960, Ser. No. 13,180
11 Claims. (Cl. 315—22)

This invention relates to a transistorized television camera having a minimum number of component parts but which has excellent performance and is reliable and trouble-free in operation.

The invention particularly relates to a television camera of the type in which a lens focuses a scene or image to be reproduced on a camera tube screen which has photo-electric properties such that a varying electrical signal is produced as it is rapidly scanned by a cathode ray or electron beam. This signal, referred to as a video signal, is transmitted to a receiver to control the intensity of an electron beam impinged on the luminescent screen of a picture tube, thereby to reproduce the image focused on the camera tube screen. Synchronizing signals are transmitted along with the video signal to cause scanning of the picture tube screen in synchronism with the scanning of the camera tube screen.

In general, the camera tube (and also the picture tube) is evacuated and comprises a cathode which is heated to emit electrons; a control electrode or grid supplied with a certain voltage to control the speed of travel of the electrons and the intensity with which they impinge on the screen; a focusing electrode or grid which controls the width of the beam of electrons; and one or more accelerating electrodes operated at relatively high potentials to accelerate the travel of the electrons toward the screen. The tube further comprises a pair of deflection means which controllably deflect the beam in transverse directions (horizontal and vertical). Each deflection means may be in the form of a coil which produces a magnetic field to cause deflection of the beam, or a pair of plates within the tube operated at different potentials to produce an electrostatic field which deflects the beam. In the conventional system, high frequency horizontal sweep signals are applied to one deflection means to cause the beam to periodically move from left to right across the screen to thereby trace horizontal lines. A vertical sweep signal of considerably lower frequency is simultaneously applied to the other deflection means to periodically move the trace of the beam from top to bottom and thereby spread out the horizontal traces of the screen.

The circuits heretofore used for applying the operating voltages to the tube and for developing the sweep signals have in general been quite complex, have required a large number of component parts and have not always been reliable and trouble-free in operation. This invention was evolved with the general object of providing circuitry having a minimum number of component parts, particularly expensive parts and yet providing reliable operation.

According to this invention, a camera circuit is provided which requires a total of only six amplifier devices to perform all necessary functions. Four devices are used for amplification of the video signal. Only two devices are required for generation of operating voltages for the cathode ray tube, generation of sweep signals and also generation of blanking and synchronizing signals. The amplifier devices are preferably transistors which may be operated from a relatively low voltage source and provide trouble-free operation.

Other and more specific objects, features and advantages will become more fully apparent from the following detailed description taken in conjunction with the accompanying drawings which illustrate a preferred embodiment and in which.

Figure 1:
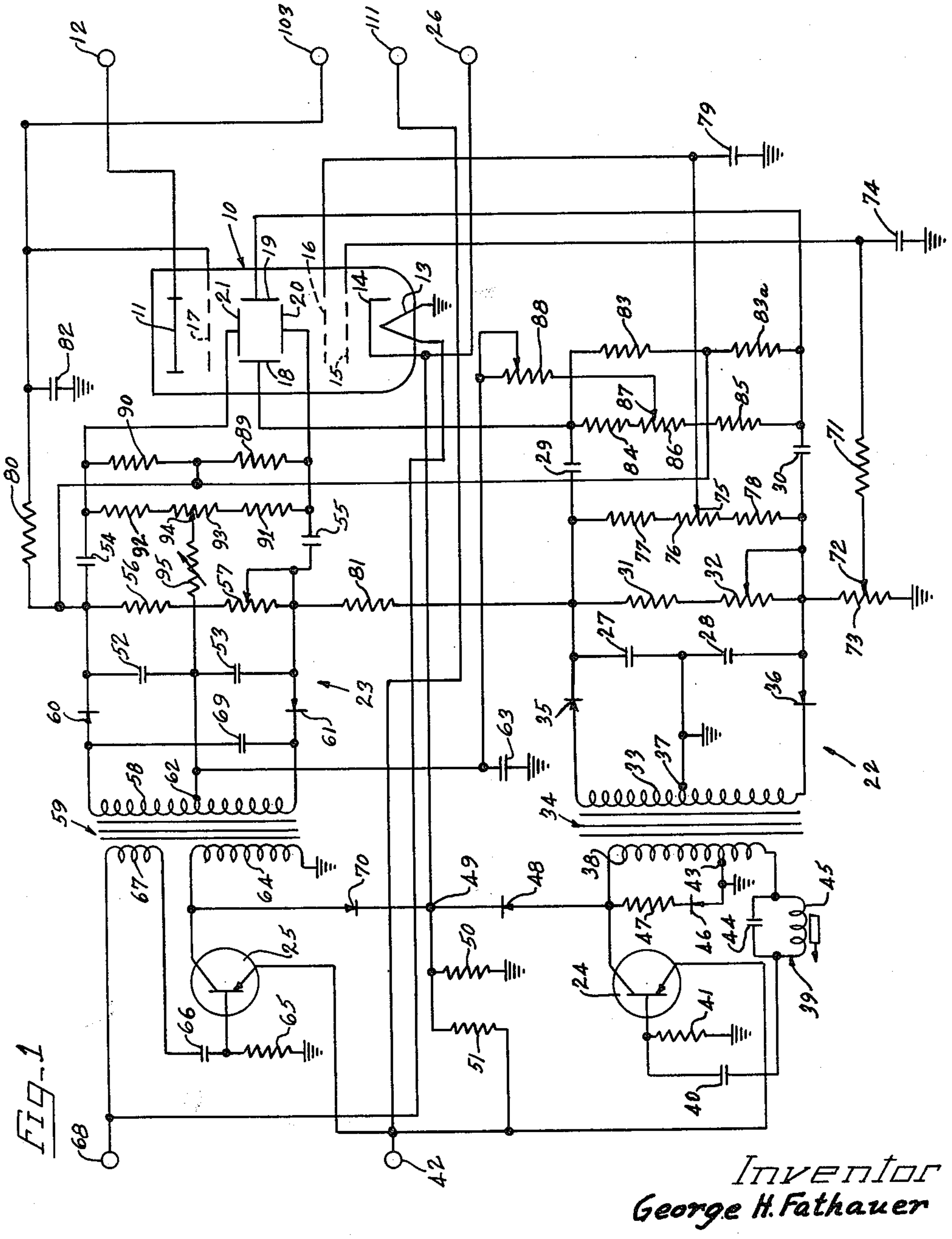
FIGURE 1 is a schematic electrical diagram of deflection and high voltage supply circuits for a television camera tube, according to the principles of this invention.

Referring to FIGURE 1, reference numeral 10 designates a television camera tube of the photo-conductive type. The tube 10 comprises a screen or target 11 on which a thin layer of photo-conductive material is deposited. A suitable lens, not shown, focuses a scene or image to be transmitted on the target 11. An electron beam scans the target, the electron current flow from the beam to the target being proportional to the light integrated since the last scan on the point at which the beam is at that instant focused. There is thus produced a video signal at a terminal 12 connected to the target 11, which is applied to the input of the video amplifier shown in FIGURE 2.

To develop the electron beam, a heater 13 heats a cathode 14 to cause emission of electrons therefrom. A control grid or electrode 15 controls the intensity and magnitude of flow of the electrons. A focusing grid or electrode 16 operates to control the width of the beam, usually in conjunction with a focusing coil, not shown. An accelerating electrode 17 is operated at a relatively high positive potential with respect to the cathode 14, and accelerates the travel of the electrons in the beam to the target or screen 11. The beam is deflected in one direction, which may be horizontal, by applying a difference in potential to a pair of deflection plates 18 and 19, and the beam is deflected in a transverse direction, which may be vertical, by applying a difference in potential to a pair of deflection plates 20 and 21.

A horizontal sweep circuit generally designated by reference numeral 22 generates a saw-tooth signal which is applied to the horizontal deflection plates 18 and 19, to cause the beam to periodically move from left to right across the screen or target 11 and thereby trace horizontal lines. The horizontal sweep circuit 22 may be operated at a relatively high rate, on the order of 15,750 sweeps per second.

A vertical sweep circuit generally designated by reference numeral 23 generates a low frequency saw-tooth signal, on the order of 60 sweeps per second, which is applied to the vertical deflection plates 20 and 21 to move the beam from top to bottom and thereby spread out the horizontal traces on the screen or target 11.

An important feature of the invention is that the horizontal sweep circuit 22 uses only a single amplifier device, a transistor 24, and the vertical sweep circuit 23 uses only a single amplifier device, a transistor 25. It is a further feature of the invention that the circuits 22 and 23 also develop operating voltages for the various electrodes of the camera tube 10. A further feature is in the generation of a blanking signal applied to the cathode 14 and the generation of a synchronizing signal at an output terminal 26.

The horizontal sweep generator 22 comprises capacitor means in the form of a pair of series-connected capacitors 27 and 28 coupled to the horizontal deflection plates 18 and 19 through a pair of capacitors 29 and 30. A voltage pulse is periodically applied to the series-connected capacitors 27 and 28 to develop a positive potential at the upper end thereof relative to the lower end. The capacitors 27 and 28 then discharge through resistance means including a fixed resistor 31 and a variable resistor 32. There is thus developed a negative-going saw-tooth signal at the upper side of the capacitor 27 and a positive-going saw-tooth signal at the lower side of the capacitor 28. These signals, applied through capacitors 29 and 30 to the plates 18 and 19, cause the electron beam to periodically move from left to right at a substantially uniform rate, thereby producing the horizontal traces or lines. The magnitude of the saw-tooth signal, and hence the horizontal size, may be adjusted by adjusting the variable resistor 32.

To periodically apply a voltage pulse to the capacitors 27, 28, they are connected to a secondary winding 33 of a transformer 34, through rectifier means including a pair of diodes 35 and 36. The secondary winding 33 has a center-tap 37 connected to ground and the junction between capacitors 27, 28. It is possible to use a single capacitor but to obtain a balanced symmetrical operation, it is preferable to use the two capacitors 27, 28 of substantially equal value connected to ground either directly as shown or through capacitor means having a large value. It is also possible to use a single rectifier and eliminate the center-tap of the secondary winding. Two separate resistors of equal value might then be connected between the upper end of the capacitor 27 and the lower end of the capacitor 28, the junction point between the two resistors providing a D.C. tap of the system.

To develop the voltage pulses in the secondary winding 33, the transformer 34 has a primary winding 38 connected to the transistor 24 in a blocking oscillator circuit. One end of the winding 38 is connected to the collector of transistor 24. The other end thereof is connected through a parallel resonant circuit 39 and a capacitor 40 to the base of transistor 24 which is connected through a resistor 41 to ground. The emitter of transistor 24 is connected to a terminal 42 which, in turn, is connected to the positive terminal of a direct current power supply illustrated in FIGURE 3, the other terminal of the power supply being connected to ground. A tap 43 of the winding 38 is also connected to ground.

In operation, the transistor 24 starts to conduct and through the winding 38 a feed-back signal is applied to the base of the transistor to increase its conduction. At the same time, the capacitor 40 is charged and in a short time the transistor 24 is cut off or "blocked" after conducting a large current. This develops a large voltage pulse in the secondary winding 33. After a certain time interval, the charge of capacitor 40 leaks off through resistor 41 to an extent such as to again permit the transistor 24 to conduct.

The resonant circuit 39, which consists of a capacitor 44 and a coil 45 provides more accurate control of the frequency, which may preferably be on the order of 15.75 kc. The free-running period of the blocking oscillator, as determined by the values of capacitor 40 and resistor 41 is somewhat longer than one cycle at the desired frequency. However, when the transistor conducts, the resonant circuit 39 is charge and thereafter "rings" to develop an oscillatory voltage which swings the base of transistor 24 negative at the proper instant of time, to thereby more accurately establish the operating frequency. A diode 46 and a resistor 47 are connected in series between the collector of transistor 24 and ground, to dampen the reverse flow of the transient produced by the transformer when the transistor is cut off.

It is necessary to transmit synchronizing signals to a receiving or reproducing system, to cause scanning of the picture tube screen in synchronism with the scanning of the camera tube screen. It is also desirable to blank the camera tube, i.e., prevent production of the video signal, during production of the synchronizing signals. In the system of this invention, the synchronizing and blanking signals are generated in a very simple fashion. In particular, advantage is taken of the fact that the collector of the transistor 24 swings highly positive, to a potential approaching the potential of the supply terminal 42, when the transistor conducts during generation of the control pulse for the horizontal sweep generator. The positive pulse generated at the collector of transistor 24 is coupled through a diode 48 to a circuit point 49 which is connected through a resistor 50 to ground. Circuit point 49 is connected to the synchronizing pulse output terminal 26 and is also connected to the cathode 14 of the camera tube 10. The positive pulse applied to the cathode 14 prevents generation of the video signal and blanks the camera tube.

A resistor 51 is connected between the circuit point 49 and the positive power supply terminal 42 and biases the circuit point 49 slightly positive so that only the clean pulse portion of the collector wave form appears across the resistor 50.

The vertical sweep generator 23 has a circuit very similar to that of the horizontal sweep generator 22. A pair of series-connected capacitors 52 and 53 are coupled through capacitors 54 and 55 to the vertical deflection plates 21 and 20. A voltage pulse is periodically applied to the capacitors 52 and 53 to establish a certain charge condition. The capacitors 52 and 53 then discharge through a fixed resistor 56 and an adjustable resistor 57 so that the voltage across the capacitors 52 and 53 gradually decreases. This voltage, applied to the deflection plates 21 and 20 causes the trace of the cathode beam to move from top to bottom across the target or screen 11.

To apply the voltage pulse to the capacitors 52, 53, a secondary winding 58 of a transformer 59 is connected thereto through rectifiers 60 and 61. The secondary winding 58 has a center-tap 62 connected to the junction between capacitors 52 and 53, and also connected through a capacitor 63 to ground. The same general considerations apply to this circuit, as are discussed above in connection with the horizontal sweep generator 22.

To generate a voltage pulse in the secondary winding 58, the transistor 25 is used in a blocking oscillator circuit similar to that described above using transistor 24, but with certain differences. In particular, the collector of transistor 25 is connected to one end of a primary winding 64 the other end of which is connected to ground. The emitter is connected to the terminal 42 and the base is connected through a resistor 65 to ground and also through a capacitor 66 to one end of a feed-back winding 67 of the transformer 59. The other end of the feed-back winding is connected to a terminal 68 which is connected to a source of synchronizing voltage. Preferably, as will be described in connection with FIGURE 3, the terminal 68 is connected to a six-volt heater winding of a power transformer and is also connected to the heater 13 of the camera tube 10, as shown.

This circuit functions in the same way as the horizontal blocking oscillator circuit described above, except that the time of conduction of the transistor 25 is controlled by the synchronizing voltage from terminal 68 (rather than from a resonant circuit) and except, of course, that the frequency of operation is much slower, preferably 60 cycles per second. A capacitor 69 is preferably connected across the secondary winding 58 to tune the winding and to develop a pulse of the proper duration. Preferably, the pulse has a duration on the order of 1000 microseconds.

A diode 70 connects the collector of the transistor 25 to the circuit point 49 to develop a vertical synchronizing and blanking pulse.

It is an important feature of the invention that by proper combination of the voltages developed in the sweep generators 22 and 23, all of the desired operating voltages for the camera tube 10 are produced. For proper operation of the camera tube 10, it is required that a negative voltage be applied to the control grid 15, preferably on the order of 50 volts. This voltage is obtained by connecting the grid 15 through a resistor 71 to a movable contact 72 of a potentiometer 73 connected between ground and the lower side of the capacitor 28. With the center-tap 37 of the transformer secondary 33 being grounded, the average D.C. potential at the lower side of the capacitor 28 may be on the order of 80 volts negative with respect to ground and hence the proper operating voltage for the control grid 15 is readily obtained by adjustment of the potentiometer. A capacitor 74 is connected between the control grid 15 and ground and cooperates with a resistor 71 and the resistance of the potentiometer 73 to provide a decoupling network which filters out the A.C. components produced by the saw-tooth form of the voltage at the lower side of the capacitor 28.

The focusing grid 16 should preferably be operated at a potential in the neighborhood of ground potential. It is connected to the movable contact 75 of a potentiometer 76 connected through resistors 77 and 78 to the upper side of the capacitor 27 and the lower side of the capacitor 28. By adjustment of the movable contact 75 an average D.C. potential is obtained equal to or above or below ground potential as desired. The focusing grid 16 is connected to ground through a capacitor 79 which cooperates with the resistances of the potentiometer 76 and resistors 77 and 78 to provide a decoupling network.

A relatively high positive potential should be applied to the accelerating grid or electrode 17. For example, about 300 volts may be required. The accelerating grid 17 is connected through a resistor 80 to the upper side of the capacitor 52, and the lower side of the capacitor 53 is connected through a resistor 81 to the upper side of the capacitor 27. The average D.C. potential of the upper side of the capacitor 27 may be on the order of 80 volts positive with respect to ground. The average voltage developed across the capacitors 52 and 53 may be on the order of about 240 volts. With the two voltages connected in series through resistor 81, the average D.C. potential of the upper side of the capacitor 52 may be on the order of 320 volts and, taking into account the voltage drop through resistor 80, the potential of the accelerating grid 17 is about 300 volts. A capacitor 82 is connected between ground and the accelerating grid 17 and cooperates with the resistor 80 to provide a decoupling network.

The deflection plates 18–21 are preferably operated at a potential somewhere between ground potential and the potential of the accelerating grid 17. In the circuit of this invention, a bridge arrangement is used to control the D.C. potentials of each pair of plates. In particular, the plates 18 and 19 are connected through resistors 83 and 83*a* to the upper side of the capacitor 52 and are also connected through resistors 84 and 85 to the opposite ends of a potentiometer 86 having a movable contact 87 connected through an adjustable resistor 88 to the center-tap 62 of the transformer secondary 58. Under the conditions described above, the center-tap 62 is at a D.C. potential of about 200 volts and the upper side of the capacitor 52 is at a D.C. potential of about 320 volts. Thus the average D.C. potential of the plates 18 and 19 is somewhere between such values. The actual average D.-C. potential of the plates 18 and 19 may be adjusted by adjustment of the resistor 88 which provides a control of astigmatism. Potentiometer contact 87 may be adjusted to control horizontal centering, and resistor 32 is adjusted to control horizontal size.

In a similar manner, the plates 20 and 21 are connected through resistors 89 and 90 to the upper side of capacitor 52 and also connected through resistors 91 and 92 to the opposite ends of a potentiometer 93 having a movable contact 94 connected through an adjustable resistor 95 to the center-tap 62. Potentiometer contact 94 is adjusted to control vertical centering, resistor 95 is adjusted to control astigmatism and resistor 57 is adjusted to control vertical size.

In the circuit of FIGURE 1, the horizontal sweep generator 22 forms a first sweep means having first and second output terminals at the lower and upper terminals of capacitors 28 and 27, respectively, a voltage of saw-tooth form being developed therebetween. Capacitors 29 and 30 couple such output terminals to the deflection means 18 and 19. The resistor 50 and the potentiometer 73, in addition to performing other functions, form resistance means which provide a direct current conductive connection between the cathode 14 and the first output terminal at the lower terminal of the capacitor 28. Resistor 81 together with resistors 57, 56 and 80 form resistance means which provide a direct current conductive connection between the second output terminal at the upper end of the capacitor 27 and the accelerating electrode 17, so that even without the vertical sweep generator 23 being operative, the horizontal sweep generator 22 would be operative to supply a potential between the accelerating electrode 17 and the cathode 14. With the vertical sweep generator 23 operative, however, it forms a second sweep means having third and fourth output terminals at the lower end of the capacitor 53 and the upper end of the capacitor 52, respectively, a voltage of saw-tooth form being developed therebetween. The resistor 81 then forms a second resistance means providing a direct current conductive connection between the second output terminal at the upper end of the capacitor 27 and the third output terminal at the lower end of capacitor 53, while resistor 80 then provides a third resistance means providing a direct current conductive connection between the fourth output terminal at the upper end of the capacitor 52 and the accelerating electrode 17.

Figure 2:
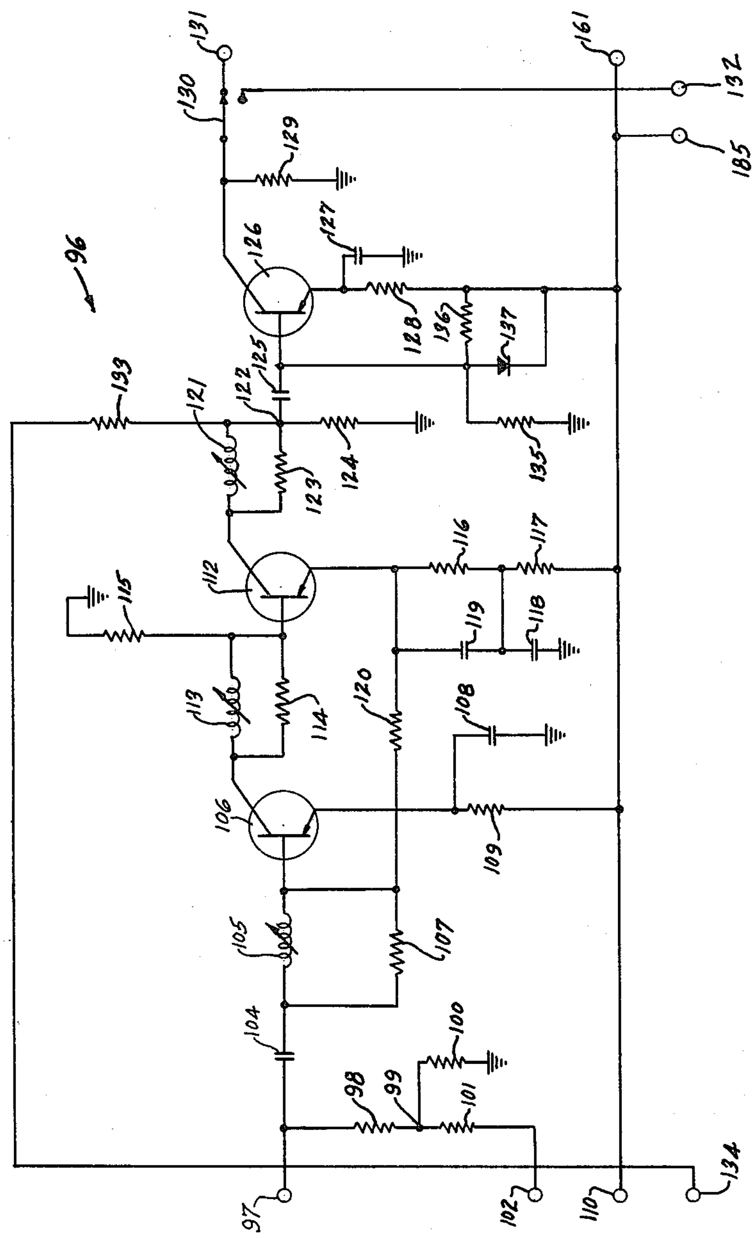
FIGURE 2 is a diagram of a video amplifier circuit for use with the circuit of FIGURE 1.

Referring now to FIGURE 2, reference numeral 96 generally designates the video amplifier portion of the television camera of this invention. Amplifier 96 functions to generate a composite signal including synchronizing pulses and, between the pulses, an amplified signal corresponding to the signal produced at the target 11 of the camera tube 10. The composite signal may be used to modulate an RF signal generated by the circuit of FIGURE 4, for transmission to a television receiver having an RF input and detection or demodulation means. In the alternative, the output of the amplifier 96 may be applied through a stage illustrated in FIGURE 5 to a transmission line, to be directly applied to a monitor or reproducer, or for transmission to a transmitter at a distance from the camera.

The video amplifier 96 comprises an input terminal 97 which is connected to the target terminal 12. Proper current for the target is applied through a resistor 98 connected to a circuit point 99 of a voltage divider network. The network comprises a resistor 100 connected between circuit point 99 and ground and a resistor 101 connected between circuit point 99 and a terminal 102 which is connected to a terminal 103 of the circuit of FIGURE 1. Terminal 103 is connected to the accelerating grid 17 and is thus at a relatively high positive potential; on the order of 300 volts.

Input terminal 97 is also connected through a capacitor 104 and an adjustable peaking coil 105 to the base of a transistor 106, a resistor 107 being connected in parallel with the coil 105. The emitter of transistor 106 is connected through a capacitor 108 to ground and through a resistor 109 to a terminal 110 which is connected to terminal 111 of the circuit of FIGURE 1. Terminal 111 is connected directly to the terminal 42 to which a positive D.C. voltage is applied from the circuit of FIGURE 3, preferably about 12 volts positive with respect to ground. The capacitor 108 together with the resistor 109 forms a decoupling filter.

The collector of transistor 106 is connected directly to the base of a transistor 112 through an adjustable peaking coil 113, a resistor 114 being connected in parallel with the coil 113 and a resistor 115 being connected between the base of transistor 112 and ground. The emitter of transistor 112 is connected through a pair of resistors 116 and 117 to the power supply terminal 110. A by-pass capacitor 118 is connected between ground and the junction between resistors 116 and 117. Capacitor 118 and resistor 117 form a decoupling network.

A capacitor 119 is connected in parallel with the resistor 116 and a resistor 120 is connected between the emitter of transistor 112 and the base of transistor 106. The resistors 116, 120 together with the capacitor 119 form a feedback network which increases the amplification factor at high frequencies relative to the factor at low frequencies. At low frequencies, the capacitor 119 has an impedance which is relatively high as compared to the resistor 116 and a degenerative feed-back is applied through the resistor 120 to the base of the transistor 106. However, at high frequencies, the capacitor 119 has a comparatively low impedance, with very little degenerative feed-back.

The collector of transistor 112 is connected through a peaking coil 121 to a circuit point 122, a resistor 123 being connected in parallel with the peaking coil 121. Circuit point 122 is connected to ground through resistor 124 and is connected through a capacitor 125 to the base of a transistor 126. The emitter of transistor 126 is connected through a capacitor 127 to ground and through a resistor 128 to the positive power supply terminal 110. Capacitor 127 and resistor 128 form a decoupling filter.

The collector of transistor 126 is connected to ground through a resistor 129 across which the output signal is developed. The collector is also connected to a selector switch contact 130, selectively connectable to an output terminal 131, for connecting to the RF oscillator circuit of FIGURE 4, or to an output terminal 132 for connection to the coupling stage of FIGURE 5.

To provide a synchronizing signal, the circuit point 122 is connected through a resistor 133 to a terminal 134 which is connected to the synchronizing pulse output terminal 26 of FIGURE 1. When the positive synchronizing pulse is applied, the transistor 126 is rendered nonconductive.

A D.C. restoration circuit is provided which comprises a resistor 135 connected between the base of transistor 126 and ground, a resistor 136 connected between the base of transistor 126 and the positive power supply terminal 110 and a diode 137 connected across the resistor 136. The resistors 135, 136 fix a bias level for the transistor 126 such that the diode 137 does not normally conduct. However, when the synchronizing pulse is applied through the resistor 133, the diode 137 can conduct, to fix the charge of capacitor 125. Thus the condition of charge of capacitor 125 is fixed at the beginning of each horizontal scan, regardless of the integrated value of the radio signal applied during the preceding scan.

Figure 3:
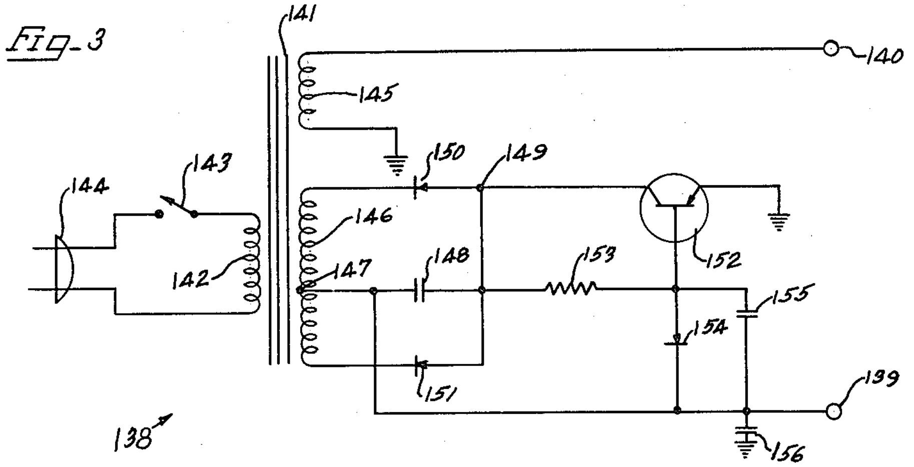
FIGURE 3 is a diagram of a power supply for the circuits of FIGURES 1 and 2.

Referring now to FIGURE 3, reference numeral 138 generally designates a preferred form of power supply for the television camera. The power supply 138 supplies a regulated D.C. voltage, preferably 12 volts, at an output terminal 139 which is connected to the terminal 42 in FIGURE 1, and also supplies an A.C. voltage at a terminal 140 which is connected to the terminal 68 in FIGURE 1, to heat the heater 13 of the camera tube 10 and to apply a synchronizing signal to the blocking oscillator of the vertical sweep generator. The power supply 138 comprises a transformer 141 having a primary 142 connectible through a switch 143 to a plug 144 for connection to a suitable alternating current supply, preferably a 115 volt 60 cycle supply.

The transformer 141 has a first secondary winding 145 connected between ground and the terminal 140, to supply an A.C. voltage preferably about 6 volts. The transformer 141 has a second secondary winding 146 connected in a full-wave rectifier circuit. A center-tap 147 of the winding 146 is connected to the output terminal 139 and is also connected through a capacitor 148 to a circuit point 149. A pair of rectifiers 150 and 151 connect the opposite ends of the winding 146 to the circuit point 149. Thus a rectified, unregulated voltage is developed across the capacitor 148. Circuit point 149 is connected to the collector of a transistor 152 having its emitter connected to ground and having its base connected through a resistor 153 to the circuit point 149, through a diode 154 to the output terminal 139, and through a capacitor 155 to the output terminal 139. The diode 154 is operated as a zener reference and the impedance of the transistor 152 is automatically controlled in response to changes in the voltage developed across the resistor 153, in a manner to maintain the output voltage substantially constant. A capacitor 156 is connected between the output terminal 139 and ground.

Figure 4:
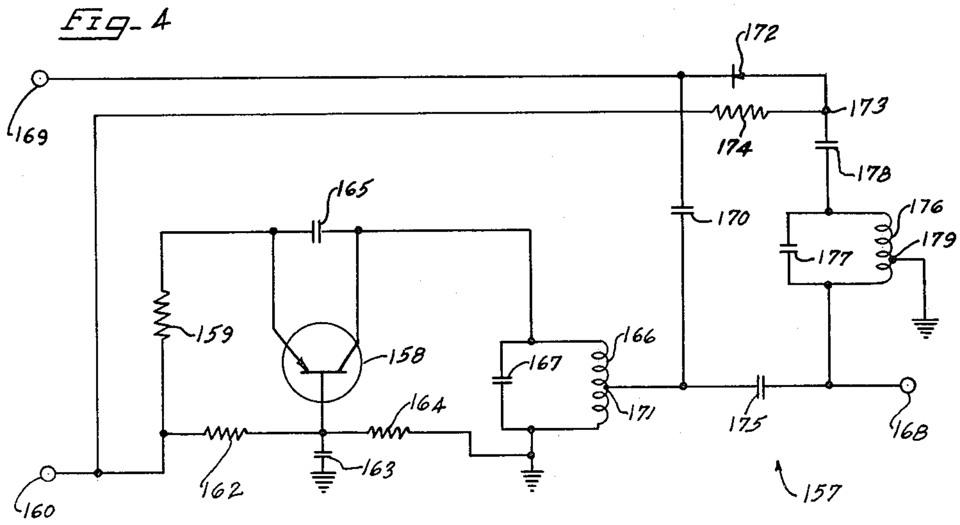
FIGURE 4 is a diagram of a radio frequency output circuit for the video amplifier of FIGURE 2.

Referring now to FIGURE 4, reference numeral 157 generally designates an RF oscillator arranged to be modulated by the video output signal from the amplifier 96, to develop a signal for transmission to a receiver having an RF input and detector or demodulator means.

The circuit 157 comprises a transistor 158 having its emitter connected through a resistor 159 to a terminal 160 connected to a terminal 161 of the circuit of FIGURE 2 which in turn is connected to the positive terminal of the direct current supply. The base of the transistor 158 is connected through a resistor 162 to the terminal 160, and through a capacitor 163 and a resistor 164 to ground. The collector of transistor 158 is connected to the emitter thereof through a capacitor 165 and is connected to ground through a resonant circuit comprising a coil 166 and a capacitor 167. The circuit as thus far described functions as an RF oscillator.

The RF oscillator is amplitude-modulated by the signal from the video amplifier 96 and is coupled to an output terminal 168 through a circuit arrangement which eliminates the video component at the output terminal 168. In particular, a terminal 169 connected to the output terminal 131 of the video amplifier, is connected through a capacitor 170 to a tap 171 on the coil 166 and is also connected through a diode 172 to a circuit point 173 connected through a resistor 174 to the power supply treminal 160. Tap 171 is connected through capacitor 175 to the output terminal 168 which is also connected to one terminal of a parallel resonant circuit comprising a coil 176 and a capacitor 177. The other terminal of the resonant circuit is connected through a capacitor 178 to the circuit point 173. A tap 179 on the coil 176 is connected to ground. With this arrangement, amplitude modulation is obtained and at the same time, the video component is eliminated at the output terminal 168.

Figure 5:
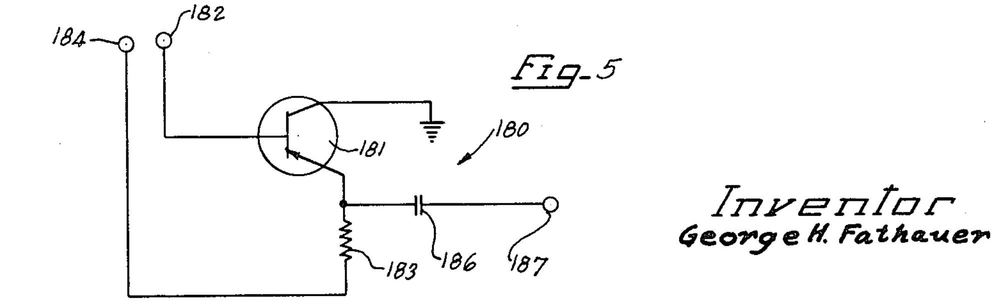
FIGURE 5 is a diagram of an alternate output circuit for the video amplifier of FIGURE 2.

Referring now to FIGURE 5, reference numeral 180 generally designates a coupling circuit which is used to couple the output of the video amplifier 96 to a transmission line, for transmission to a monitor or reproducing device, or to a transmitter at a distance from the camera. The coupling circuit 180 comprises a transistor 181 operated in an emitter-follower circuit. In particular, the collector of transistor 181 is connected to ground, the base is connected to a terminal 182, connected to the output terminal 132 of the amplifier circuit 96, and the emitter is connected through a resistor 183 to a terminal 184 connected to a terminal 185 of the video amplifier circuit 96 which, in turn, is connected to the positive terminal of the D.C. supply. A capacitor 186 is connected between the emitter and an output terminal 187 to remove the direct current component from the transmission line.

By way of illustrative example and not by way of limitation, the principal components may have the following values:

| Reference numeral: | Value |
|---|---|
| 27 | 1500 micro-microfarads. |
| 28 | 1500 micro-microfarads. |
| 29 | 0.005 microfarads. |
| 30 | 0.005 microfarads. |
| 31 | 470K. |
| 32 | 500K. |
| 40 | 0.068 microfarads. |
| 41 | 8.2K. |
| 44 | 0.1 microfarads. |
| 45 | 1 millihenry. |
| 47 | 82 ohms. |
| 50 | 2.2K. |
| 51 | 27K. |
| 52, 53 | 0.47 microfarads. |
| 54, 55 | 0.22 microfarads. |
| 56 | 470K. |
| 57 | 500K. |
| 63 | 4 microfarads. |
| 65 | 3.9K. |
| 66 | 50 microfarads. |
| 69 | 1500 micro-microfarads. |
| 71 | 4.7M. |
| 73 | 5M. |
| 74 | 0.047 microfarads. |
| 76 | 5M. |
| 77, 78 | 2.2M. |
| 79 | 0.047 microfarads. |
| 80 | 1M. |
| 81 | 680K. |
| 82 | 0.22 microfarads. |
| 83, 83*a*, 84, 85 | 4.7M. |
| 86 | 5M. |
| 88 | 5M. |
| 89, 90, 91, 92 | 4.7M. |
| 93 | 5M. |
| 95 | 5M. |
| 98 | 900M. |
| 100, 101 | 22M. |
| 104 | 470 micro-microfarads. |
| 107 | 18K. |
| 108 | 15 microfarads. |
| 109 | 10K. |
| 114 | 18K. |
| 115 | 33K. |
| 116 | 390 ohms. |
| 117 | 1.8K. |
| 118 | 25 microfarads. |
| 119 | 680 micro-microfarads. |
| 120 | 47K. |
| 123 | 18K. |
| 124 | 4.7K. |
| 127 | 680 micro-microfarads. |
| 128 | 150 ohms. |
| 129 | 4.7K. |
| 133 | 560K. |
| 135 | 150K. |
| 136 | 10K. |
| 148 | 400 microfarads. |
| 153 | 270 ohms. |
| 155 | 200 microfarads. |
| 156 | 400 microfarads. |
| 159 | 1K. |
| 162 | 10K. |
| 163 | 470 micro-microfarads. |
| 164 | 56K. |
| 165 | 3.3 micro-microfarads. |
| 167 | 10 micro-microfarads. |
| 170 | 150 micro-microfarads. |
| 174 | 15K. |
| 175 | 0.7 micro-microfarads. |
| 177 | 15 micro-microfarads. |
| 178 | 10 microfarads. |
| 183 | 220 ohms. |
| 186 | 200 microfarads. |

The diodes may be of the following types:

| Reference numeral: | Type |
|---|---|
| 35, 36 | 1N485. |
| 46 | 1N482. |
| 48 | 1N90. |
| 60, 61 | 1N487. |
| 70 | 1N90. |
| 137 | T7G. |
| 150, 152 | 1N482. |
| 172 | T7G. |

Both transistors 24 and 25 should have good beta at high peak currents and should have low saturation resistance. Type No. 2N521 is suitable. The transistors in the video amplifier, transistors 106, 112 and 126 should preferably be drift type transistors rather than surface barrier transistors to obtain a low collector to base feedback ratio and permit use of the peaking coils without obtaining regeneration troubles. Type No. 2N645 is suitable, and the same type may also be used for the transistors 158 and 181. For the power supply, the transistor 152 can be a moderate grade transistor with a medium power dissipation rating. Type Nos. 2N1038 and 2N1124 are suitable.

It will be understood that modifications and variations may be effected without departing from the spirit and scope of the novel concepts of this invention.

I claim as my invention:

1. In a television system, a cathode ray tube including a screen, electrodes for impinging a cathode ray beam on said screen and deflection means for causing said beam to scan said screen, sweep capacitor means, means including resistance means connected to said capacitor means for changing the charge of said capacitor at a uniform rate from one value to another, means for periodically and abruptly changing the charge of said capacitor from said another value back to said one value to establish a voltage of saw-tooth form, means providing a center-tap connection for said capacitor means, means having a low AC impedance connecting said center-tap connection to a point at a fixed potential relative to the potentials of said beam-forming electrodes, and means for applying said voltage of saw-tooth form to said deflection means.

2. In a television system, a cathode ray tube including a screen, electrodes for impinging a cathode ray beam on said screen, a pair of sweep capacitors connected in series, a transformer secondary winding having a center-tap connected to the junction between said capacitors, a pair of rectifiers connecting the end terminals of said secondary winding to said sweep capacitors, a transformer primary winding inductively coupled to said secondary winding, means for periodically applying a high current pulse to said primary winding to induce a high voltage pulse in said secondary winding and charge said capacitors to a certain value through said rectifier means, resistance means connected across said capacitors for gradually discharging said capacitors between applications of said voltage pulses, and means connecting said sweep capacitors to said deflection means.

3. In a television system, a cathode ray tube including a screen, electrodes for impinging a cathode ray beam on said screen and deflection means for causing said beam to scan said screen, first sweep capacitor means, first charging means for periodically applying at a relatively low rate a high voltage pulse to said first sweep capacitor means to develop a certain charge out of said first capacitor means, first resistance means connected across said first capacitor means for discharging said capacitor means at a substantially uniform rate between applications of said high voltage pulse thereby to develop a first voltage of saw-tooth form at a relatively low frequency, second sweep capacitor means, second charging means for periodically applying at a relatively high rate a high voltage pulse to said second sweep capacitor means to develop a certain charge thereof, second resistance means connected across said second capacitor means for discharging said second capacitor means at a substantially uniform rate between applications of said high voltage pulses thereto, thereby to develop a second voltage of saw-tooth form and of relatively high frequency, means for applying said voltages to said deflection means, and means for applying operating potentials to said electrodes including means connecting said voltages in series.

4. In a television system, a cathode ray tube including a screen, electrodes for impinging a cathode ray beam on said screen and deflection means for causing said beam to scan said screen, a blocking oscillator comprising a primary coil and a transistor arranged to periodically conduct a large current pulse through said coil, a secondary coil inductively coupled to said primary coil and having a high ratio of turns to said primary coil to periodically develop high voltage pulses in response to said high current pulses, sweep capacitor means, rectifier means for applying said high voltage pulses to said sweep capacitor means, resistance means connected to said capacitor means to gradually reduce the voltage across said capacitor means between said high voltage pulses, thereby to develop a voltage of saw-tooth form, means for applying said voltage of saw-tooth form to said deflection means, and means coupling said blocking oscillator to one of said electrodes to apply a blanking signal upon conduction of said transistor.

5. In a television system,
a cathode ray tube including a screen,
electrodes for impinging a cathode ray beam on said screen including a cathode, a control grid and at least one accelerating electrode,
and deflection means for causing said beam to scan said screen,
sweep means having first and second output terminals and arranged to develop a voltage of saw-tooth form between said terminals,
capacitor means coupling said output terminals to said deflection means to apply said voltage of saw-tooth form thereto,
first resistance means providing a first direct current conductive connection between said cathode and said first output terminal,
and second resistance means providing a second direct current conductive connection between said accelerating electrode and said second output terminal to apply a positive operating voltage at said accelerating electrode relative to said cathode.

6. In a television system,
a cathode ray tube including a screen, electrodes for impinging a cathode ray beam on said screen including a cathode, a control grid and at least one accelerating electrode,
and deflection means for causing said beam to scan said screen,
sweep means having first and second output terminals and arranged to develop a voltage of saw-tooth form between said terminals,
capacitor means coupling said output terminals to said deflection means to apply said voltage of saw-tooth form thereto,
first resistance means providing a first direct current conductive connection between said cathode and said first output terminal,
second resistance means providing a second direct current conductive connection between said accelerating electrode and said second output terminal to apply a positive operating voltage at said accelerating electrode relative to said cathode,
and means associated with said resistance means for effectively removing alternating current components.

7. In a television system,
a cathode ray tube including a screen,
electrodes for impinging a cathode ray beam on said screen including a cathode, a control grid and at least one accelerating electrode,
and a pair of deflection means for causing said beam to scan said screen,
first sweep means having first and second output terminals and arranged to develop a voltage of saw-tooth form between said terminals,
second sweep means having third and fourth output terminals and arranged to develop a voltage of saw-tooth form between said third and fourth output terminals,
first capacitor means coupling said first and second output terminals to one of said deflection means,
second capacitor means coupling said third and fourth output terminals to the other of said deflection means,
first resistance means providing a first direct current conductive connection between said first output terminal and said cathode,
second resistance means providing a second direct current conductive connection between said second and third output terminals,
and third resistance means providing a third direct current conductive connection between said fourth output terminal and said accelerating electrode to apply a potential to said accelerating electrode positive relative to said cathode.

8. In a television system,
a cathode ray tube including a screen,
electrodes for impinging a cathode ray beam on said screen including a cathode, a control grid and at least one accelerating electrode,
and deflection means for causing said beam to scan said screen,
sweep capacitor means,
means for periodically applying a high voltage pulse to said sweep capacitor means to develop a certain charge of said capacitor means, resistance means connected across said capacitor means for discharging said capacitor means at a substantially uniform rate between applications of said high voltage pulse, thereby to develop a voltage of saw-tooth form,
means for applying said voltage to said deflection means,
and resistance means providing direct current conductive connections between said sweep capacitor means and said cathode and said accelerating electrode to apply a positive operating potential to said accelerating electrode relative to said cathode.

9. In a television system,
a cathode ray tube including a screen,
electrodes for impinging a cathode ray beam on said screen including a cathode, a control grid and at least one accelerating electrode,
and deflection means for causing said beam to scan said screen,
sweep means having first and second output terminals and arranged to develop a voltage of saw-tooth form between said output terminals,
means including a pair of coupling capacitors for coupling said output terminals to said deflection means to apply said voltage of saw-tooth form thereto,
first resistance means providing a first direct current conductive connection between said cathode and said first output terminal,
and second resistance means providing a second direct current conductive connection between said accelerating electrode and said second output terminal to apply a positive operating voltage at said accelerating electrode relative to said cathode.

10. In a television system,
a cathode ray tube including a screen,
electrodes for impinging a cathode ray beam on said screen including a cathode, a control grid and at least one accelerating electrode, and deflection means for causing said beam to scan said screen,
sweep means having first and second output terminals and arranged to develop a voltage of saw-tooth form between said terminals,
capacitor means coupling said output terminals to said deflection means to apply said voltage of saw-tooth form thereto,
first resistance means providing a first direct current conductive connection between said cathode and said first output terminal,
second resistance means providing a second direct current conductive connection between said accelerating electrode and said second output terminal to apply a positive operating voltage at said accelerating electrode relative to said cathode,
and third resistance means providing the third direct current conductive connection between said first output terminal and said control grid for applying a negative bias potential to said control grid relative to said cathode.

11. In a television system,
a cathode ray camera tube including a photoconductive screen adapted to have an image focused thereon,
electrodes for impinging a cathode ray beam on said screen including a cathode, a control grid and at least one accelerating electrode,
and deflection plates for causing said beam to scan said screen,
sweep means having first and second output terminals and arranged to develop a voltage of saw-tooth form between said output terminals,
capacitor means coupling said output terminals to said deflection plates to apply said voltage of saw-tooth form thereto,
first resistance means providing a first direct current conductive connection between said cathode and said first output terminal,
second resistance means providing a second direct current conductive connection between said accelerating electrode and said second output terminal,
and a video amplifier arranged to amplify signals developed at said photo-conductive screen.

References Cited in the file of this patent

UNITED STATES PATENTS

| | | |
|---|---|---|
| 2,084,157 | McLennan | June 15, 1937 |
| 2,227,076 | Geiger | Dec. 31, 1940 |
| 2,373,396 | Hefele | Apr. 10, 1945 |
| 2,458,366 | Flyer | Jan 4, 1949 |
| 2,599,798 | Wissel | June 10, 1952 |
| 2,601,153 | Knight | June 17, 1952 |
| 2,726,355 | Friend | Dec. 6, 1955 |
| 2,794,149 | Jones | May 28, 1957 |
| 2,860,284 | McKim | Nov. 11, 1958 |
| 2,890,403 | Van Abbe | June 9, 1959 |
| 2,918,602 | Fyler | Dec. 22, 1959 |
| 2,954,504 | Saudinaitis et al. | Sept. 27, 1960 |
| 2,992,359 | Thalner | July 11, 1961 |
| 2,993,142 | Harvey | July 18, 1961 |
| 2,994,802 | Shelby | Aug. 1, 1961 |

OTHER REFERENCES

IRE Dictionary—Institute of Radio Engineers, Inc., N.Y., 1961, TK 7804 I5.